United States Patent
Adams et al.

(10) Patent No.: US 12,505,273 B2
(45) Date of Patent: Dec. 23, 2025

(54) DIVIDING A CHIP DESIGN FLOW INTO SUB-STEPS USING MACHINE LEARNING

(71) Applicant: Synopsys, Inc., Mountain View, CA (US)

(72) Inventors: Amzie Allen Adams, Raleigh, NC (US); Joseph R. Walston, Durham, NC (US); Piyush Verma, Sunnyvale, CA (US)

(73) Assignee: Synopsys, Inc., Sunnyvale, CA (US)

( * ) Notice: Subject to any disclaimer, the term of this patent is extended or adjusted under 35 U.S.C. 154(b) by 595 days.

(21) Appl. No.: 17/857,737

(22) Filed: Jul. 5, 2022

(65) Prior Publication Data

US 2023/0004698 A1 Jan. 5, 2023

Related U.S. Application Data

(60) Provisional application No. 63/218,011, filed on Jul. 2, 2021.

(51) Int. Cl.
*G06F 30/392* (2020.01)
*G06F 30/27* (2020.01)
*G06F 30/31* (2020.01)
*G06F 30/394* (2020.01)

(52) U.S. Cl.
CPC ............ *G06F 30/392* (2020.01); *G06F 30/27* (2020.01); *G06F 30/31* (2020.01); *G06F 30/394* (2020.01)

(58) Field of Classification Search
CPC ..................................................... G06F 30/392
USPC ......................................................... 716/119
See application file for complete search history.

(56) References Cited

U.S. PATENT DOCUMENTS

2022/0083720 A1* 3/2022 Chouba .................... G06N 3/04

* cited by examiner

*Primary Examiner* — Eric D Lee
(74) *Attorney, Agent, or Firm* — Lowenstein Sandler LLP

(57) ABSTRACT

A method includes generating a plurality of intermediate designs for a chip by executing a first sub-step based on a first plurality of inputs, adding at least one intermediate design of the plurality of intermediate designs to a second plurality of inputs, generating a plurality of final designs by executing a second sub-step of the step of the design flow based on the second plurality of inputs, and selecting using a machine learning model a final design from the plurality of final designs. The first sub-step is a sub-step of a step of a design flow and the first plurality of inputs corresponds to input parameters associated with the first sub-step.

16 Claims, 5 Drawing Sheets

DIVIDING A CHIP DESIGN FLOW INTO SUB-STEPS USING MACHINE LEARNING

RELATED APPLICATION

The present application claims the benefit under 35 U.S.C. § 119(e) of U.S. Provisional Patent Application No. 63/218,011 filed on Jul. 2, 2021, which is incorporated herein by reference in its entirety for all purposes.

TECHNICAL FIELD

The present disclosure relates to chip design. More specifically, the present disclosure relates to chip design using flow-slicing.

BACKGROUND

An integrated circuit (IC) design flow typically includes many stages where a designer may make a design choice. Examples include, but are not limited to, chip size, chip aspect ratio, pin placement, macro placement, power distribution, design flow, timing margin, and design tool settings. Each design choice is an input that may impact a quality of result (QoR) of a final design of the IC.

SUMMARY

In some aspects, a method includes generating a plurality of intermediate designs for a chip by executing a first sub-step based on a first plurality of inputs, adding at least one intermediate design of the plurality of intermediate designs to a second plurality of inputs, generating a plurality of final designs by executing a second sub-step of the step of the design flow based on the second plurality of inputs, and selecting using a machine learning model a final design from the plurality of final designs. The first sub-step is a sub-step of a step of a design flow and the first plurality of inputs corresponds to input parameters associated with the first sub-step.

In some aspects, a system includes a memory storing instructions and a processor coupled with the memory and to execute the instructions. The instructions when executed cause the processor to generate a plurality of intermediate designs for a chip by executing a first sub-step of a design flow based on a first plurality of inputs, add at least one intermediate design of the plurality of intermediate designs to a second plurality of inputs, generate a plurality of final designs by executing a second sub-step of the step of the design flow based on the second plurality of inputs, and select using a machine learning model a final design from the plurality of final designs. The first sub-step is a sub-step of a step of a design flow and the first plurality of inputs corresponds to input parameters associated with the first sub-step.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
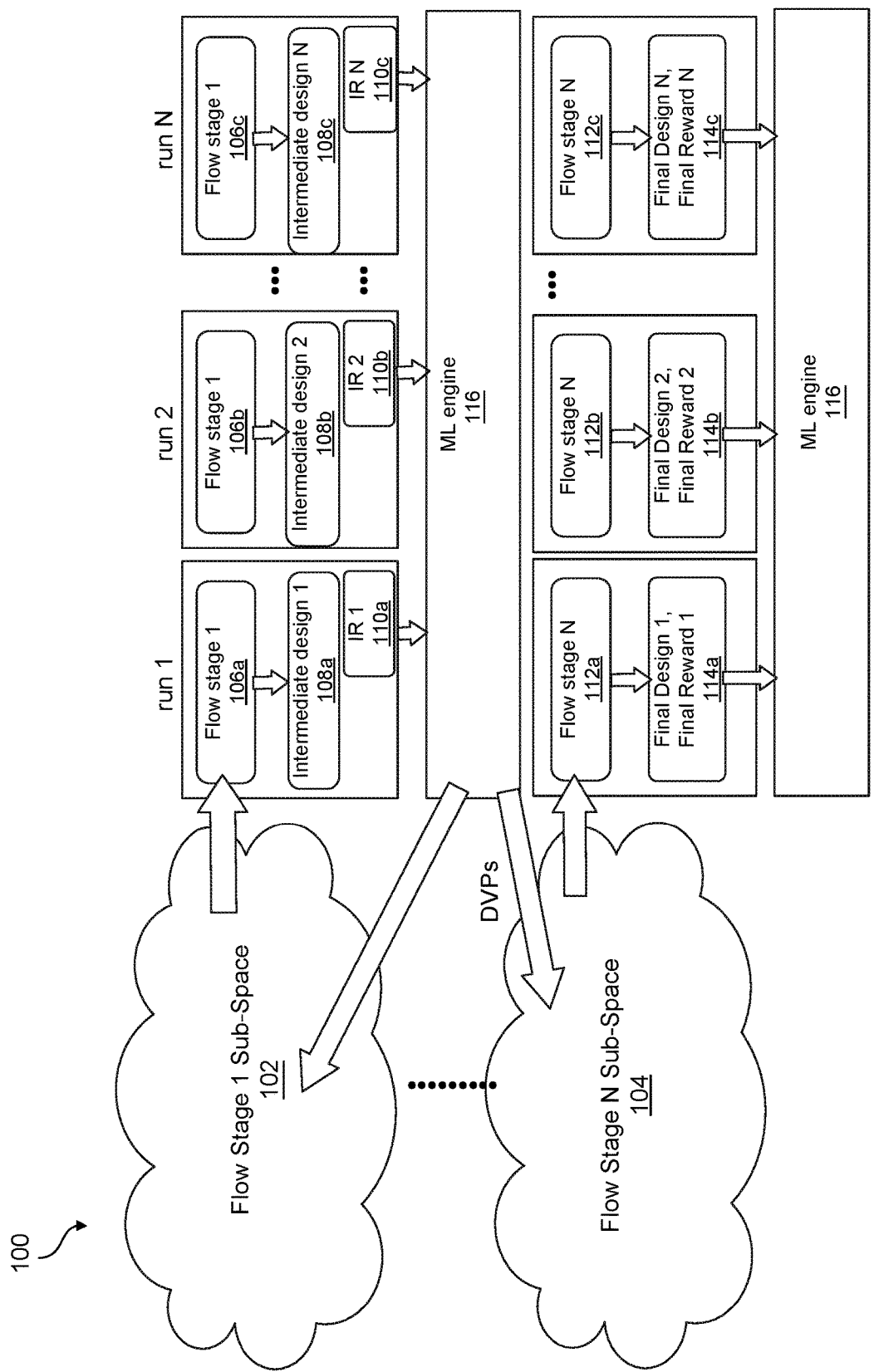
FIG. 1 is a schematic that shows a flow optimization process with flow-slicing, in accordance with an embodiment of the present disclosure.

Aspects of the present disclosure relate to dividing a chip design flow into sub-steps using machine learning.

There are many possible variable inputs (e.g., chip size, chip aspect ratio, pin placement, macro placement, power distribution, design flow, timing margin) to a design flow for a chip, and each input impacts the quality (QoR) of the final chip. Inputs (variable inputs) may be referred to as permutons. In some aspects, the union of all inputs across the entire design flow represents the total design search space (i.e., full design search space). The total design search space is enormous ($10^{12}$ possible combinations is not unusual). Accordingly, it is impractical to search the total design search space exhaustively. Machine Learning (ML) can be used by a search system. For example, the search system may be an autonomous artificial intelligence application or tool for chip design (e.g., DSO.ai™ from SYNOPSYS) to automate the selection of inputs and improve QoR, but ML requires a reward function. The reward function requires running the design flow and design flows take a long time to execute, even with optimal input choices. A single search may be referred to as a "session."

Unfortunately, the reward function can only be accurately measured at the end of the entire design flow, and design flows take a long time to execute. Some input choices degrade QoR and dramatically increase runtime. The increased runtime typically happens in detail routing and slows down the entire search process. The search system relies on trial jobs finishing in a timely manner so that it can learn from them. When jobs languish in routing, the search system is deprived of useful information and the final QoR of the entire search can suffer as a result.

In some embodiments, a "flow slicing" process is used. With flow-slicing, the entire design flow is sliced (divided) into sub-steps. The total design search space is also divided into sub-spaces with each sub-space chosen (i.e., selected) to match each flow sub-step. The smaller sub-spaces (compared to the whole design search space) reduce the computational requirement to search at each flow sub-step. Running each sub-step is faster than running the entire design flow, giving designers intermediate results quickly. As a sub-step is near completion, ML is used to select top diverse design results and dynamically start the next sub-step (i.e., subsequent sub-step). This allows sub-step executions to overlap, speeding up runtime.

Multiple independent ML methods can be used to select top diverse results. Users are free to explicitly specify which ML method(s) are used, but the search system also provides an intelligent default method. Thus, the user may be presented with one or more ML methods to select from. These top diverse design results become values of a design view permuton (DVP) and are added to the search space of the next flow sub-step. Users are also free to select top diverse design results from multiple sessions running in parallel, and users are free to dynamically change the sub-steps as searches are executed.

In some embodiments, the flow-slicing process divides a complex design flow into sub-steps and optimizes an appropriate sub-space of inputs for each sub-step. Intermediate reward functions are calculated at each sub-step. The intermediate rewards drive ML optimization of the sub-space for that sub-step. Sub-steps are chained together sequentially in a dynamic and overlapping way to complete the entire design flow.

ML is also used to select top diverse intermediate designs at each sub-step. Intermediate designs can be selected from multiple sessions running in parallel. The intermediate designs are automatically added to the input sub-space of the next sub-step and are used as the input designs for the next sub-step. Sub-steps are automatically chained together sequentially to complete the optimization of the entire design flow. Optimization of sub-steps can begin as soon as results become available from a previous sub-step. This dynamic overlapping optimization of sub-steps decreases runtime.

By passing forward multiple top diverse designs from each sub-step to a subsequent sub-step, the ML engines can sample a rich variety of different design implementations without having to search the entire input space at once. The DVP diversity mitigates miscorrelation between sub-steps and significantly improves final QoR.

The flow-slicing process is very flexible. That is, it supports an unlimited number of flow sub-steps, user-defined or completely automated intermediate reward functions, and user-defined or completely automated intermediate design selection. The selection of top diverse designs to pass forward can be adjusted dynamically between sub-steps. Designs can be passed forward from multiple sessions running in parallel. Users can change the sub-step definitions dynamically. The system also allows the final end-of-flow reward functions to drive ML optimization of earlier flow sub-steps.

Technical advantages of the present disclosure include, but are not limited to, faster runtime, use of less computing resources, better QoR, and intermediate ML-ranked designs. The faster runtime and smaller compute also enable designers to search larger inputs spaces. In some embodiments, flow-slicing provides an easy-to-use, efficient, and flexible process for optimizing the design flow in sub-steps. As discussed above, optimizing an entire design flow in a single pass (time consuming pass) has many disadvantages. The disadvantages include but are not limited to extremely long runtimes, larger ML compute requirements, and inferior final results. In one or more embodiments, flow-slicing overcomes these problems.

As described previously, the full design flow is divided up into sub-steps. Likewise, the full design search space is divided into sub-spaces. Each flow sub-step has a corresponding sub-space. The corresponding sub-space includes inputs that impact that flow sub-step. As an example, a full design flow might be divided into three sub-steps: place, clock, and route. The place sub-step can explore a sub-space of inputs that impact placement. The clock sub-step can explore a sub-space of inputs that impact clock tree synthesis. The route sub-step can explore a sub-space of inputs that impact routing and post-route optimization.

In some embodiments, a search system executes each flow sub-step separately and sequentially and uses ML to optimize the sub-spaces. A ML model is driven by intermediate reward functions that are appropriate for each sub-step of the flow. For example, if the sub-step being executed is place, the intermediate reward function may be an aggregate design score (ADES) that includes a total negative slack, a routing congestion, a die size and a leakage power. Because the design is not yet routed at place, routing design rule checks (DRCs) are not included in the intermediate reward function.

As each flow sub-step is optimized, the search system stores diverse designs based on the intermediate reward functions. Multiple independent reward functions can be used to select which designs are stored. Because intermediate reward functions do not correlate perfectly to reward functions at the end of the flow, multiple diverse best designs are stored. Each best design is treated as a single value of a DVP. The DVPs from each flow sub-step become part of the input search space for the next flow sub-step. As with other inputs, the search system automatically learns which DVPs produce the best QoR at the end of the next flow sub-step. This process repeats sequentially until the entire design flow has been optimized. As discussed above, any number of DVP values can be passed forward from any sub-step to a subsequent sub-step. Users can dynamically change sub-step definitions during a search, and sub-steps may have not to be completed before optimization of the next sub-step begins. Sub-spaces, intermediate reward functions, and DVPs can also all be selected automatically by the search system.

FIG. 1 is a schematic that shows a flow optimization process 100 with flow-slicing, in accordance with an embodiment of the present disclosure. A design flow may be divided into sub-steps or stages. For example, the design flow may be divided into N-stages. FIG. 1 shows, as an example, flow stages 1 (106a, 106b, 106c) and flow stages N (112a, 112b, 112c).

In some aspects, the design flow may be associated with a physical implementation. In some aspects, the design flow may be associated with a place and route process of the physical implementation. A first stage (i.e., first sub-step) may correspond to place. A second stage may correspond to clock and a third stage may correspond to route. In another example, a floor planning stage may be added before the place stage. The stages may also include a power planning stage and/or post route stage. A user may provide different stages. For example, the user may select to divide each of the place stage, clock stage, or place stage into further sub-steps or stages.

As described previously herein, the design search space is divided into sub-spaces. Each design search sub-space includes input parameters that impact only that flow sub-step. For example, for a place stage, the inputs may include an initial design, one or more steps that execute the placement or place stage flow, and permutons. The permutons may include inputs for a ML engine 116. For example, flow stages 1 (106a, 106b, 106c) may have a corresponding sub-space 102 and flow stages N (112a, 112b, 112c) may have a corresponding sub-space 104. The sub-space 104 of the flow stages N may include intermediate designs from the previous sub-stage.

In some embodiments, inputs for the clock stage may include designs (intermediate designs or DVP) from the previous stage (e.g., place stage), a flow script for the clock, and the permutons for the clock stage. Inputs for a floor planning stage may include the permutons and an initial design. The permutons for the floor planning stage may include a die size (chip size), aspect ratio of the chip (e.g., square, L-shaped), placement of pins around edges of the chip.

In some aspects, multiple runs may be executed in parallel. For example, N runs may be executed in parallel. Each run may have a different set of inputs. As described previously herein each flow stage may have a corresponding subspace. Inputs for each run (e.g., flow stage 106a, flow stage 106b, flow stage 106c) for the first flow stage may be selected from sub-space 102. Inputs for each run of flow stage N (e.g., flow stage 112a, flow stage 112b, flow stage 112c) may be selected from the sub-space 104.

Each flow sub-step produces intermediate designs and intermediate rewards (IRs). For example, a first run 106a of the first flow stage may produce intermediate design 108a and intermediate reward 110a. Similarly, the second run produces intermediate design 108b and intermediate reward 110b and the Nth run produces intermediate design 108c and intermediate reward 110c. The ML engine 116 evaluates all the IRs (110a, 110b, and 110c) and uses them to optimize the sub-space for that sub-step (i.e., sub-space 102). The ML engine 116 may analyze the IRs, identify optimal input parameters from the sub-space 102, identify one or more intermediate designs, and add the identified intermediate designs to the search space of next stage (i.e., subsequent sub-stage). The intermediate designs are added to the sub-space of the next flow sub-step as DVP values. The intermediate designs may be identified based on the value of the corresponding IR. The chain continues sequentially until the entire design flow is completed and the final reward functions are known. For example, flow stage N (e.g., flow stage 112a, flow stage 112b, flow stage 112c) may result in final designs and final rewards (114a, 114b, and 114c). The final designs and the final rewards are passed to the ML engine 116 to select a final design for the chip. For example, once the entire design flow has been optimized, the search system has the ability to optimize early flow sub-steps using the final reward functions by starting with the final rewards and tracing backwards through the design flow. A sub-space for a sub-stage may be optimized based on the final reward function. For example, the sub-spaces associated with flow stage 1 through flow stage N may be optimized based on final reward (114a, 114b, 114c). Optimizing the sub-space may include identifying optimal input parameters from the sub-space. This provides the advantage of an improvement in the search efficiency and the power, performance, and area of the final designs generated by the system.

Figure 2:
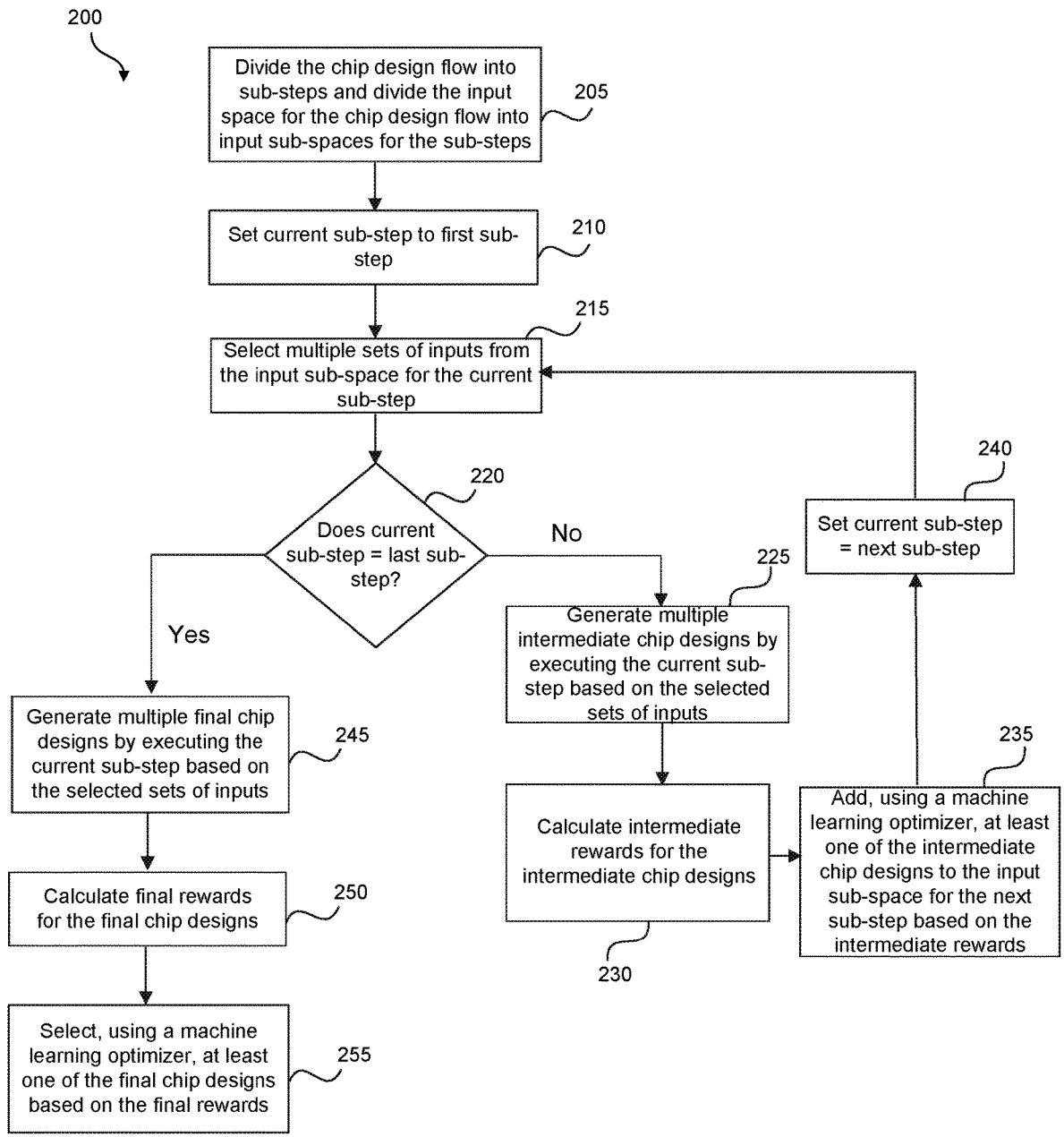
FIG. 2 is a flowchart for a flow-slicing method, in accordance with an embodiment of the present disclosure.

FIG. 2 shows a flowchart for flow-slicing method 200, in accordance with an embodiment of the present disclosure. At 205, the design flow is divided into sub-steps and the input space for the chip design flow is divided into input sub-spaces for the sub-steps. The sub-steps may have a sequence/order (e.g., place, clock, and route).

At 210, the first sub-step in the sequence determined in 205 is set as the current sub-step. For example, place may be set as the current sub-step.

At 215, multiple sets of inputs are selected from the input sub-space for the current sub-step. As described previously herein, the sub-space or design search subspace for the current sub-step includes inputs that may affect the sub-stage.

At 220, a determination is made whether the current sub-step is the last (or final) sub-step in the sequence of sub-steps. In response to determining that the current sub-step is the last sub-step of the sequence, the process proceeds to 245 (i.e., resulting in a Yes in 220). In response to determining that the current sub-step is not the last sub-step of the sequence (i.e., resulting in a No in 220), the process proceeds to 225.

At 225, multiple intermediate designs (i.e., design obtained after a sub-step, also may be referred to as multiple intermediate chip designs) are generated by executing the current sub-step based on the selected sets of inputs. Specifically, one run of the current sub-step may be executed against one set of inputs, a second run of the current sub-step may be executed against a second set of inputs, and the like. These runs may be executed in parallel.

At 230, intermediate rewards are calculated for the multiple intermediate designs. At least one of the intermediate rewards may be calculated using a reward function specific to the current sub-step. For example, after a placement sub-stage, an estimate of how fast the chip is running may be fed to the reward function.

At 235, a machine learning engine (e.g., ML optimizer such as, for example, a processor that executes one or more machine learning operations) analyses the intermediate rewards and adds the one or more of the intermediate designs to the input sub-space corresponding to the next sub-step. For example, if the current sub-step is sub-step k, one or more of the intermediate designs are added to the input sub-space for sub-step k+1. The intermediate designs added to the input sub-space for sub-step k+1 may later be used as inputs for the k+1 sub-step.

At 240, the next sub-step in the sequence is deemed to be the current sub-step. For example, if prior to executing 240 the current sub-step is sub-step j, after executing step 240 the current sub-step is deemed to be sub-step j+1. Then, the process proceeds to 215 and 220.

At 245, multiple final designs (or multiple final chip designs) are generated by executing the current sub-step (e.g., the final sub-step) based on the selected sets of inputs. Specifically, one run of the current sub-step may be executed against one set of inputs, a second run of the current sub-step may be executed against a second set of inputs, and the like. These runs may be executed in parallel.

At 250, final rewards are calculated for the multiple final chip designs. At least one of the final rewards may be calculated using a reward function specific to the current sub-step. For example, an accurate frequency of the chip may be fed to the reward frequency.

At 255, the ML engine analyses the final rewards and selects at least one of the chip designs.

Figure 3:
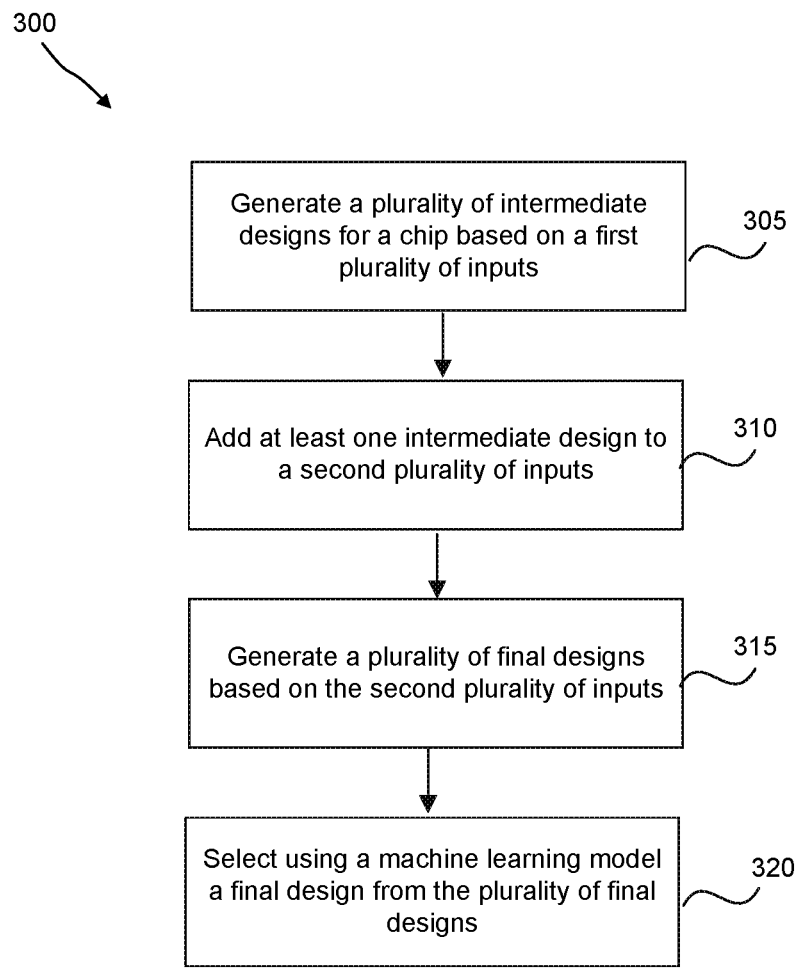
FIG. 3 is a flowchart for a design flow method, in accordance with an embodiment of the present disclosure.

FIG. 3 is a flowchart for a design flow method 300, in accordance with an embodiment of the present disclosure.

In 305, a plurality of intermediate designs for a chip may be generated based on a first plurality of inputs. For example, the plurality of intermediate designs may be generated by executing a first sub-step of a design flow. The first sub-step may be obtained by dividing the design flow into a plurality of sub-steps that includes the first sub-step and a second sub-step. In some aspects, the input space for the design flow is divided into a plurality of input sub-spaces that includes a first sub-space (that corresponds to the first sub-step) and a second sub-space (that corresponds to the second sub-step).

In 310, at least one intermediate design of the plurality of intermediate designs are added to a second plurality of inputs. For example, a plurality of intermediate rewards for the plurality of intermediate designs are determined and the at least one intermediate design is selected based on the plurality of intermediate rewards.

In some aspects, the plurality of intermediate rewards are determined based on the estimated metric. The estimated metric may be indicative of a performance of each intermediate design of the plurality of intermediate designs.

In 315, a plurality of final designs are generated based on the second plurality of inputs by executing the second sub-step. In some aspects, a plurality of final rewards corresponding to the plurality of final designs may be determined.

In 320, a final design may be selected from the plurality of final designs using a machine learning model. In some aspects, the final design is selected based on the plurality of final rewards.

Table 1 shows exemplary test results for a design with and without flow-slicing in accordance with an embodiment of the present disclosure. The results corresponding to the design using flow-slicing show better QoR and are achieved in approximately half the runtime. Flow-slicing improved the aggregate design score (ADES) by about 36%, total negative slack (TNS) by about 18%, total routing DRCs by about 22% and standard cell area by about 1.3%.

TABLE 1

Exemplary results

| Metric | Without flow-slicing | With flow-slicing | Improvement from flow-slicing |
| --- | --- | --- | --- |
| Runtime | About 14 days | About 7 days | About 50% |
| ADES | 1.80 | 1.15 | About 36% |
| TNS | −43.9 | −37.3 | About 18% |
| Total DRC's | 555 | 430 | About 22% |
| Standard cell area | 123890 | 122333 | About 1.3% |

Figure 4:
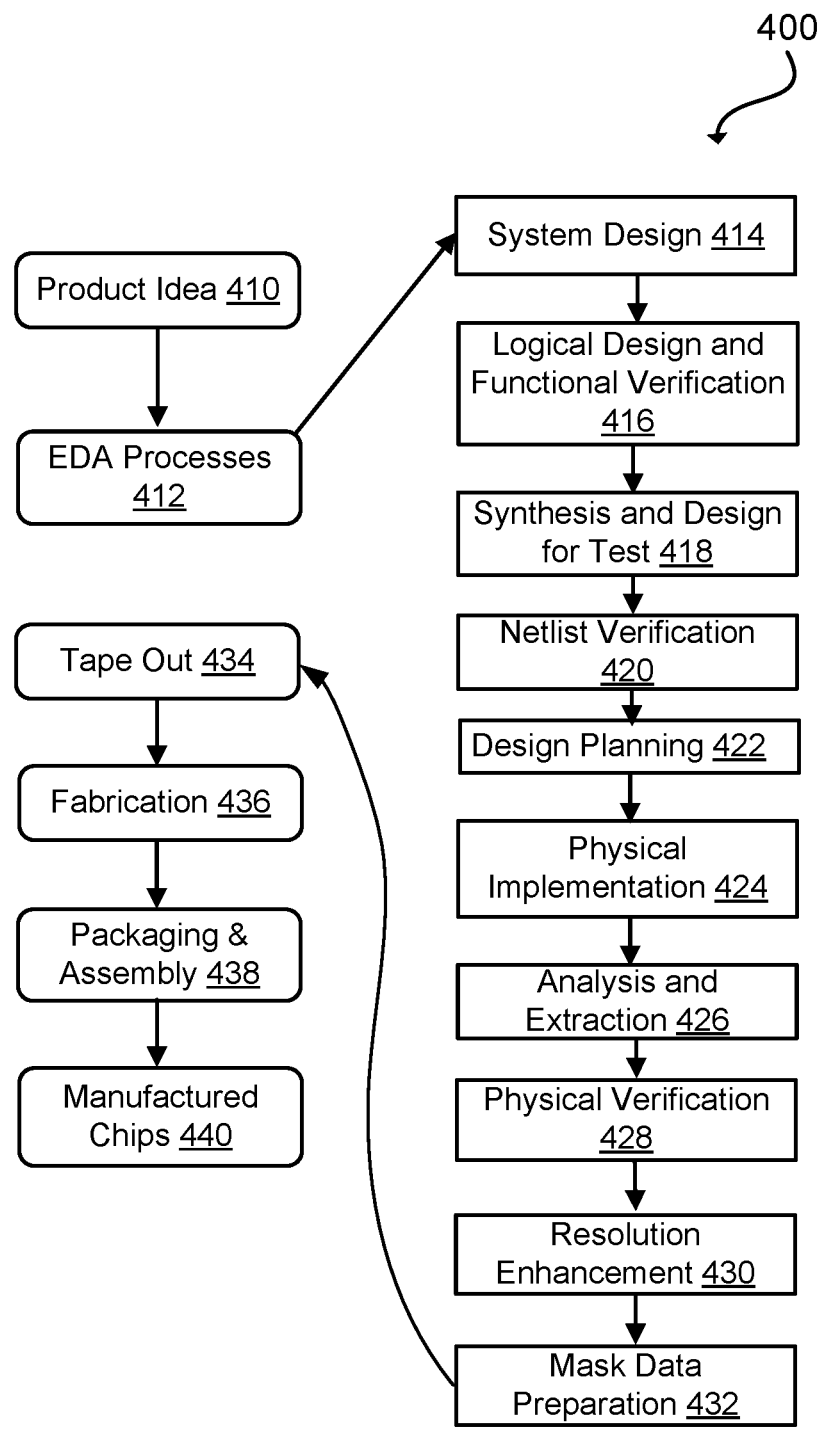
FIG. 4 depicts a flowchart of various processes used during the design and manufacture of an integrated circuit, in accordance with an embodiment of the present disclosure.

FIG. 4 illustrates an example set of processes 400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 410 with information supplied by a designer, information which is transformed to create an article of manufacture that uses a set of EDA processes 412. When the design is finalized, the design is taped-out 434, which is when artwork (e.g., geometric patterns) for the integrated circuit is sent to a fabrication facility to manufacture the mask set, which is then used to manufacture the integrated circuit. After tape-out, a semiconductor die is fabricated 436 and packaging and assembly processes 438 are performed to produce the finished integrated circuit 440.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 4. The processes described can be enabled by EDA products (or EDA systems).

During system design 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 420, the netlist is checked for compliance with timing constraints and for correspondence with the HDL code. During design planning 422, an overall floor plan for the integrated circuit is constructed and analyzed for timing and top-level routing.

During layout or physical implementation 424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 426, the circuit function is verified at the layout level, which permits refinement of the layout design. During physical verification 428, the layout design is checked to ensure that manufacturing constraints are correct, such as DRC constraints, electrical constraints, lithographic constraints, and that circuitry function matches the HDL design specification. During resolution enhancement 430, the geometry of the layout is transformed to improve how the circuit design is manufactured.

During tape-out, data is created to be used (after lithographic enhancements are applied if appropriate) for production of lithography masks. During mask data preparation 432, the 'tape-out' data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 5:
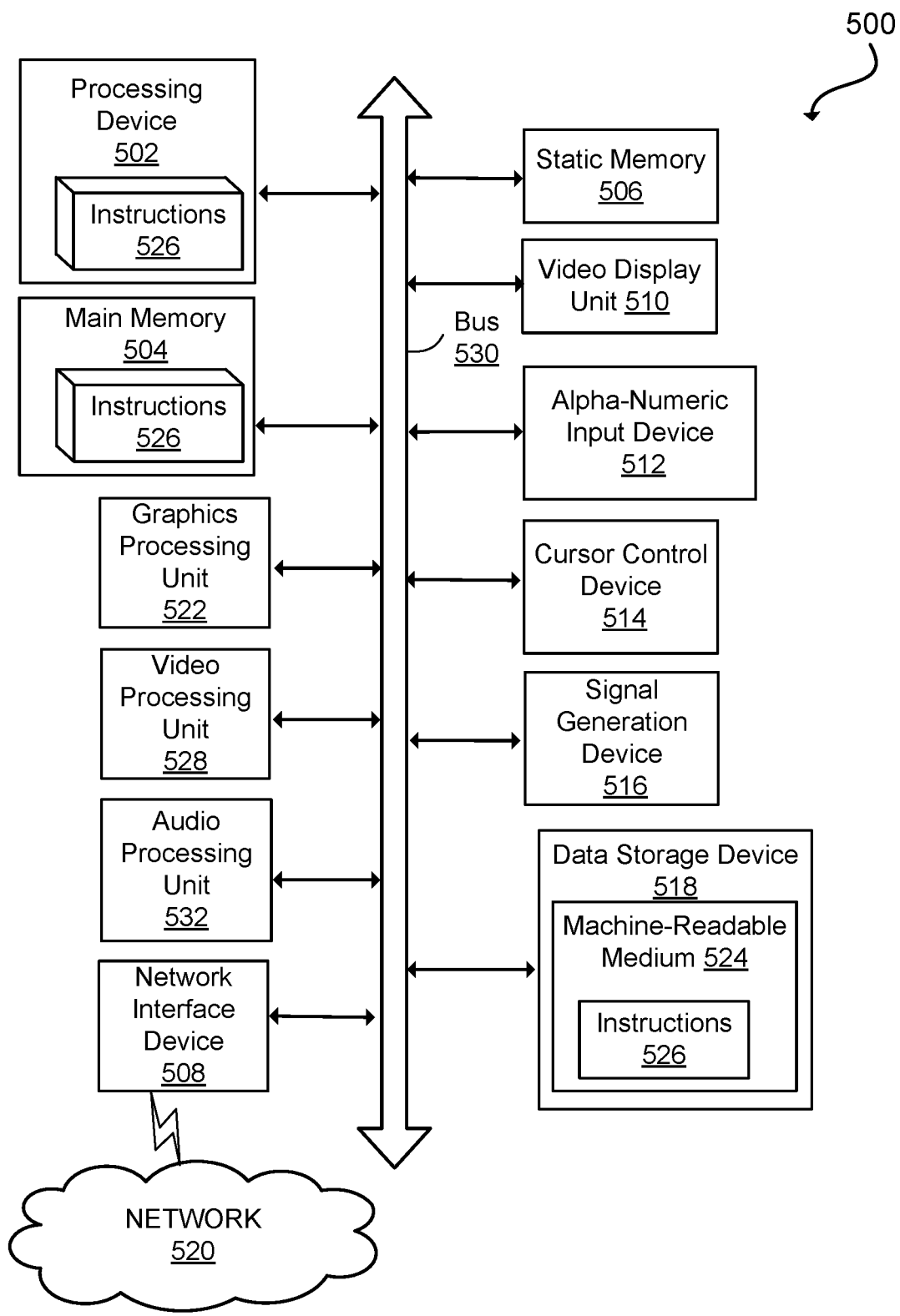
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    dividing a chip design flow into a plurality of sub-steps, where each sub-step corresponds to a different stage of chip design;
    dividing an input space of the chip design flow into a plurality of input sub-spaces, wherein each input sub-space corresponds to a respective sub-step and comprises input parameters associated with the respective sub-step;
    generating a plurality of intermediate designs for a chip by executing a first sub-step of the plurality of sub-steps based on a first plurality of inputs selected from a first input sub-space of the plurality of input sub-spaces, wherein the first plurality of inputs corresponds to input parameters associated with the first sub-step;
    selecting, by a processor using a machine learning model, at least one intermediate design of the plurality of intermediate designs generated by the first sub-step;
    adding, by the processor, the at least one intermediate design of the plurality of intermediate designs to a second plurality of inputs for a second sub-step of the step of the chip design flow;
    generating, by the processor, a plurality of final designs by executing the second sub-step of the step of the chip design flow based on the second plurality of inputs; and
    selecting, by the processor using the machine learning model, a final design from the plurality of final designs.

2. The method of claim 1, further comprising:
    determining a plurality of intermediate rewards for the plurality of intermediate designs; and
    selecting the at least one intermediate design based on the plurality of intermediate rewards.

3. The method of claim 2, further comprising:
    estimating a metric indicative of a performance of each intermediate design of the plurality of intermediate designs; and
    determining the plurality of intermediate rewards based on the estimated metric.

4. The method of claim 1, further comprising:
    calculating a plurality of final rewards corresponding to the plurality of final designs; and
    selecting the final design based on the plurality of final rewards.

5. The method of claim 1, wherein the chip design flow is a physical implementation flow and wherein the first sub-step comprises at least one of a place sub-step, a clock sub-step, or a route sub-step.

6. A system, comprising:
    a memory storing instructions; and
    a processor, coupled with the memory and to execute the instructions, the instructions when executed cause the processor to:
        divide a chip design flow into a plurality of sub-steps, where each sub-step corresponds to a different stage of chip design;
        divide an input space of the chip design flow into a plurality of input sub-spaces, wherein each input sub-space corresponds to a respective sub-step and comprises input parameters associated with the respective sub-step;
        generate a plurality of intermediate designs for a chip by executing a first sub-step of the plurality of sub-steps based on a first plurality of inputs selected from a first input sub-space of the plurality of input sub-spaces, wherein the first plurality of inputs corresponds to input parameters associated with the first sub-step;
        select, using a machine learning model, at least one intermediate design of the plurality of intermediate designs generated by the first sub-step;
        add at least one intermediate design of the plurality of intermediate designs to a second plurality of inputs for a second sub-step of the step of the chip design flow;
        generate a plurality of final designs by executing the second sub-step of the step of the chip design flow based on the second plurality of inputs; and
        select, using the machine learning model, a final design from the plurality of final designs.

7. The system of claim 6, wherein the processor is further configured to:
    determine a plurality of intermediate rewards for the plurality of intermediate designs; and
    select the at least one intermediate design based on the plurality of intermediate rewards.

8. The system of claim 7, wherein the processor is further configured to:
    estimate a metric indicative of a performance of each intermediate design of the plurality of intermediate designs; and
    determine the plurality of intermediate rewards based on the estimated metric.

9. The system of claim 6, wherein the processor is further configured to:
    calculate a plurality of final rewards corresponding to the plurality of final designs; and
    select the final design based on the plurality of final rewards.

10. The system of claim 6, wherein the chip design flow is a physical implementation flow and wherein the first sub-step comprises at least one of a place sub-step, a clock sub-step, or a route sub-step.

11. A non-transitory computer readable medium comprising stored instructions, the instructions, which when executed by a processor, cause the processor to:
divide a chip design flow for a chip into a plurality of sub-steps, where each sub-step corresponds to a different stage of chip design;
divide an input space for the chip design flow into a plurality of input sub-spaces, wherein each input sub-space corresponds to a respective sub-step of the plurality of sub-steps and comprises input parameters associated with the respective sub-step;
generate a plurality of intermediate designs for the chip by executing a first sub-step of the plurality of sub-steps based on a first plurality of inputs selected from a corresponding first input sub-space of the plurality of input sub-spaces, wherein the first plurality of inputs corresponds to input parameters associated with the first sub-step;
select using a machine learning model an intermediate design from the plurality of intermediate designs generated by the first sub-step; and
select using the machine learning model a final design for the chip based on at least the intermediate design.

12. The non-transitory computer readable medium of claim 11, wherein the processor is further configured to:
determine a plurality of intermediate rewards for the plurality of intermediate designs; and
select the intermediate design based on the plurality of intermediate rewards.

13. The non-transitory computer readable medium of claim 12, wherein the processor is further configured to:
estimate a metric indicative of a performance of each intermediate design of the plurality of intermediate designs; and
determine the plurality of intermediate rewards based on the estimated metric.

14. The non-transitory computer readable medium of claim 11, wherein the plurality of sub-steps are in a sequential order and wherein the processor is further configured to:
generate a plurality of final designs by executing a last sub-step of the plurality of sub-steps;
calculate a plurality of final rewards corresponding to the plurality of final designs; and
select the final design based on the plurality of final rewards.

15. The non-transitory computer readable medium of claim 14, wherein the processor is further configured to:
identify an input sub-space from the plurality of input sub-spaces based on the plurality of final rewards.

16. The non-transitory computer readable medium of claim 11, wherein the processor is further configured to:
execute a plurality of runs for each sub-step of the plurality of sub-steps.

* * * * *